March 16, 1937.  J. W. JOHNSTON  2,073,697
BLANK MEASURING AND SORTING MACHINE
Filed Aug. 30, 1933  4 Sheets—Sheet 1
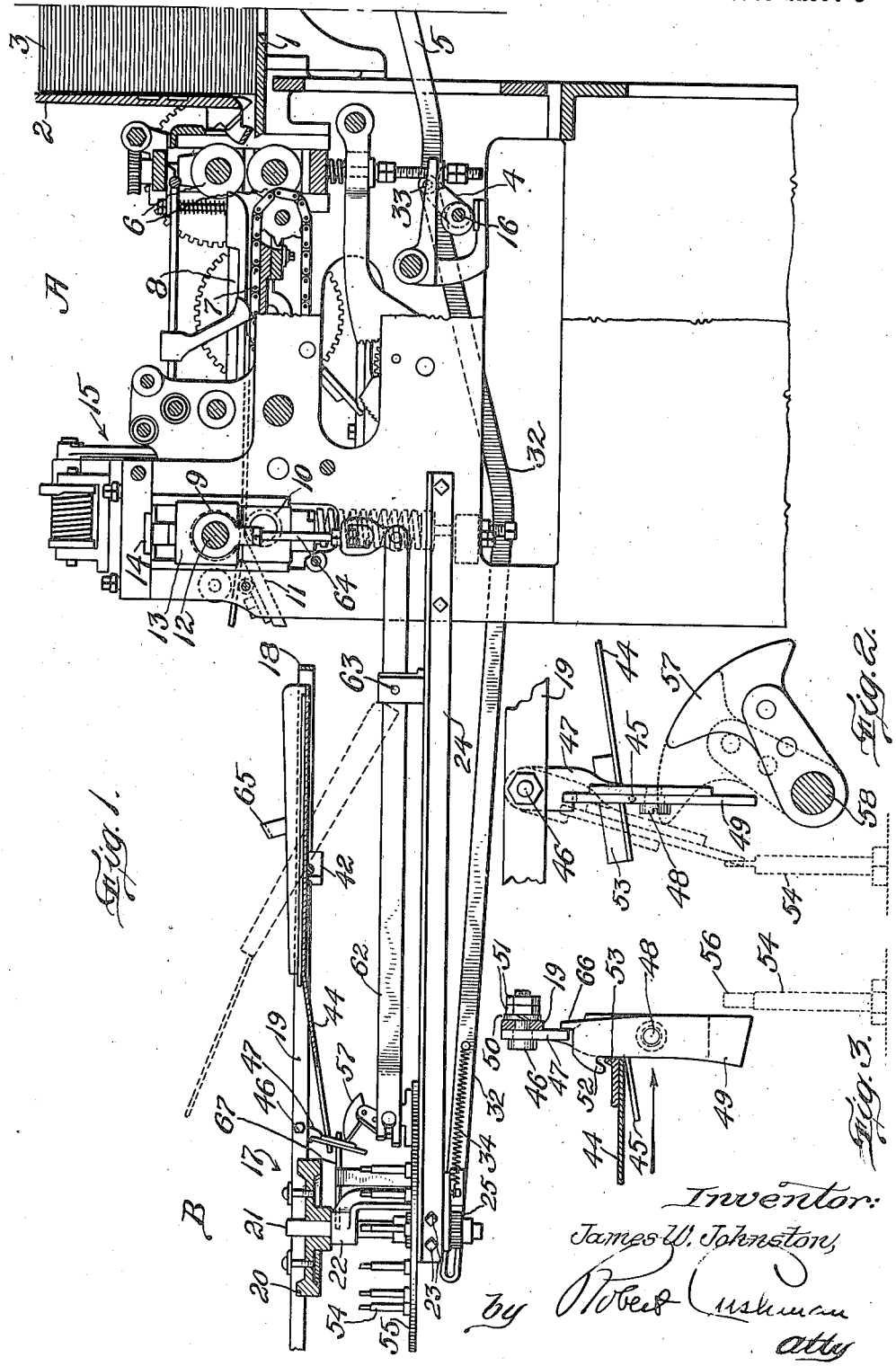
Inventor:
James W. Johnston,
by Robert Cushman
atty

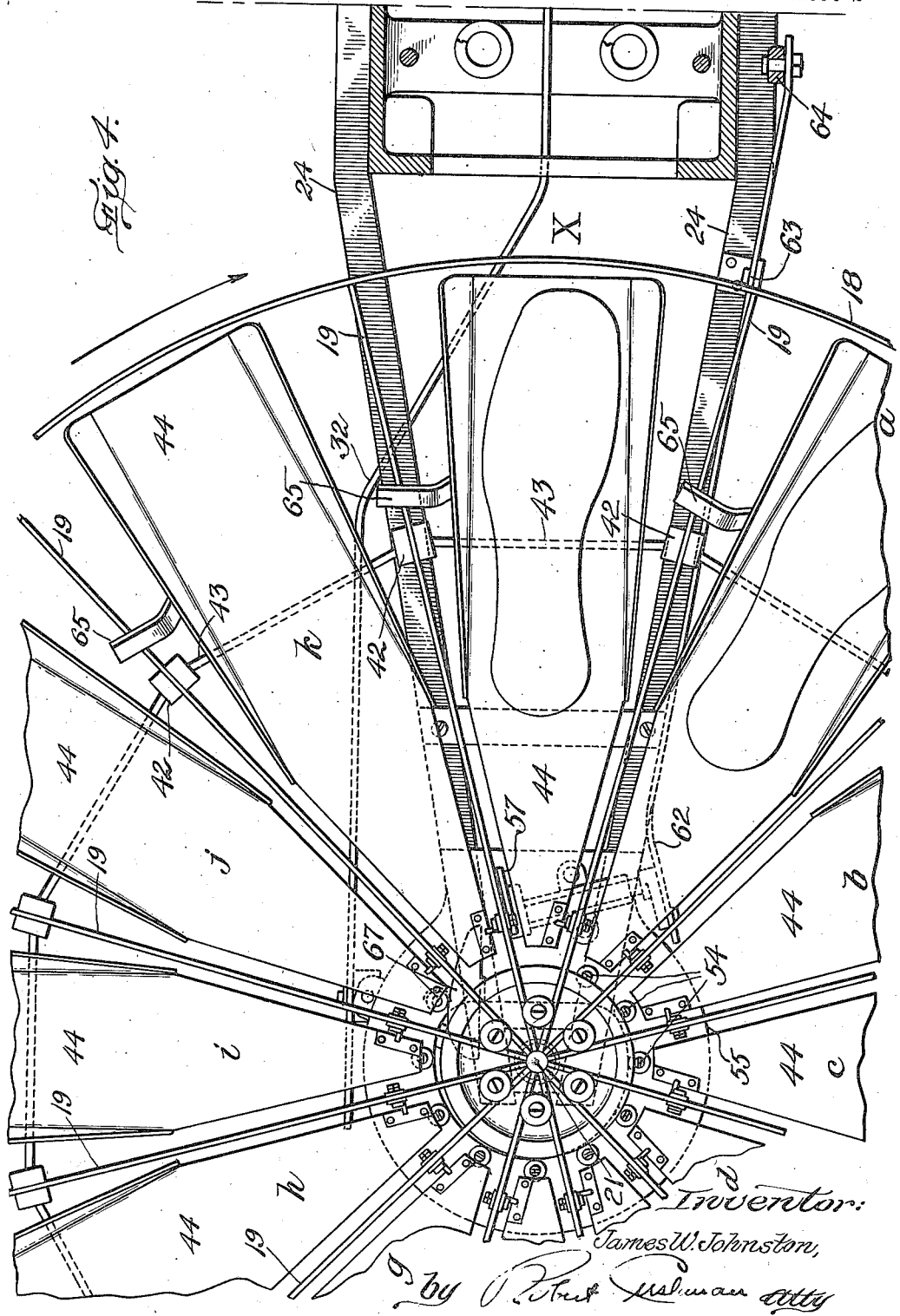

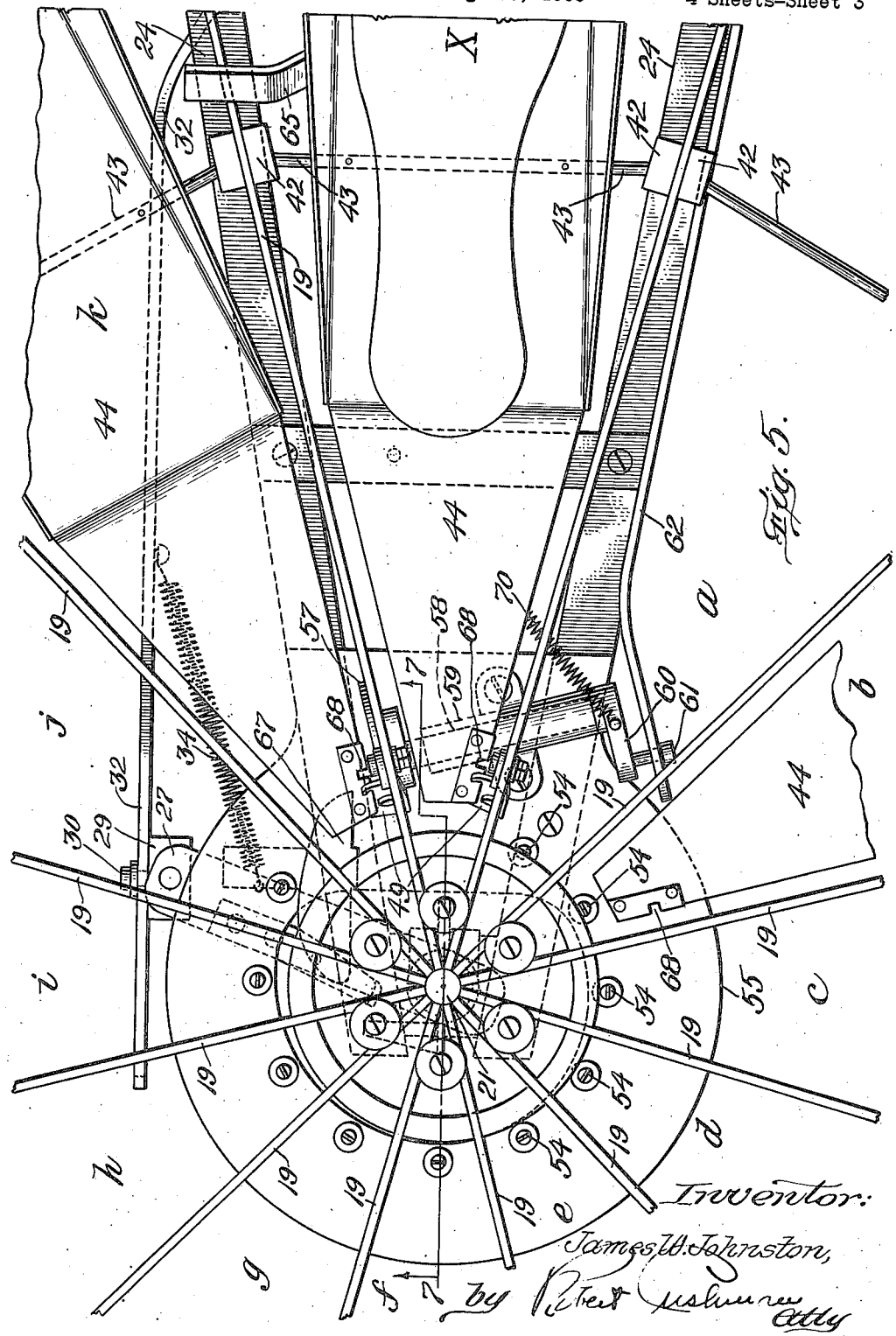

March 16, 1937.  J. W. JOHNSTON  2,073,697
BLANK MEASURING AND SORTING MACHINE
Filed Aug. 30, 1933    4 Sheets—Sheet 4
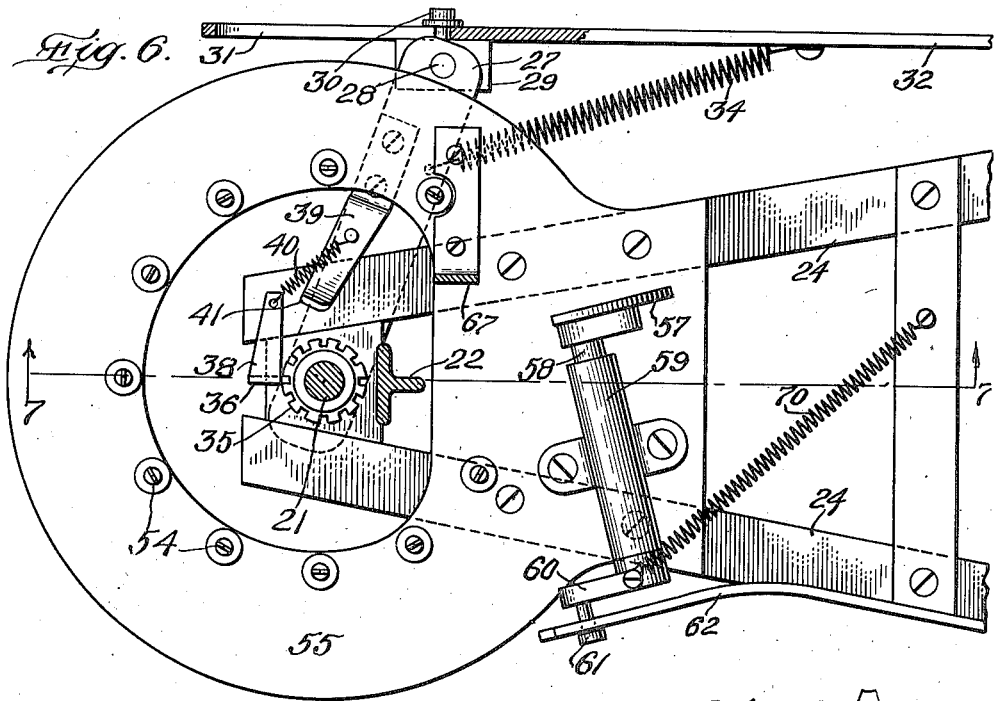
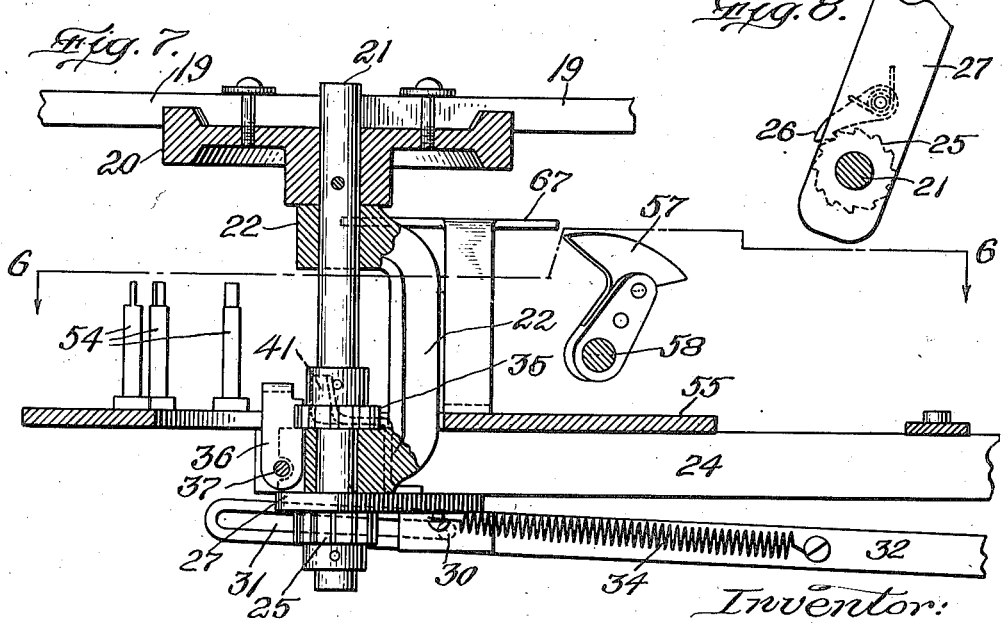
Inventor:
James W. Johnston,
by [signature] atty Patented Mar. 16, 1937

2,073,697

UNITED STATES PATENT OFFICE 2,073,697

BLANK MEASURING AND SORTING MACHINE

James W. Johnston, Manchester, N. H., assignor to North American Holding Corporation, Syracuse, N. Y., a corporation of New York Application August 30, 1933, Serial No. 687,426

10 Claims. (Cl. 209—88)

This invention relates to machines for measuring, distributing and sorting soles, heel lifts, taps and other blanks of the kinds used in shoemaking, according to their thickness. The machine is of that type, characteristic of the well-known Nichols and Cogswell machines for grading leather blanks, whether by evening, marking, indicating or sorting, which measures and grades each blank according to the thickness (usually in terms of irons and half irons) of the thinnest part of the blank, or of a selected area of the blank, as determined by the detecting and measuring means.

In the accompanying drawings:

Fig. 1 is a side elevation, partly broken away, of an evening, grade-marking and sorting machine embodying the invention;

Fig. 2 is a detail on an enlarged scale showing the construction and operation of one of the latches and associated parts hereinafter described;

Fig. 3 shows one of the latches and associated parts viewed at right angles to the view shown in Fig. 2;

Fig. 4 is a plan view, partly in section and partly broken away, of a portion of the sorting or distributing mechanism shown in Fig. 1;

Fig. 5 is a similar plan view on a larger scale of a portion of the sorting or distributing mechanism shown in Fig. 4;

Fig. 6 is a section on line 6—6 of Fig. 7 showing parts of the distributing mechanism;

Fig. 7 is a vertical section on line 7—7 of Fig. 6; and

Fig. 8 is a detail in plan of a ratchet and pawl device shown in Fig. 7.

The measuring, evening and grade-marking mechanisms are indicated generally at A in Fig. 1, and the sorting or distributing mechanism is indicated generally at B.

The measuring, evening and grade-marking mechanisms A, selected for the purpose of illustration, are substantially similar to those more fully described in the Cogswell Patent No. 1,726,610, granted September 3, 1929 for a Grading machine. For a detailed description of such a grading machine reference may be had to said Cogswell patent. Since the present invention has to do particularly with the sorting or distributing mechanism, it will be sufficient for the purposes of this application to point out in a brief and general way only the main factors of said grading machine.

The machine includes a table 1 which constitutes the bottom of a hopper or magazine 2 for holding a stack of soles, taps or other blanks 3. The blanks are fed into the machine one by one from the bottom of the stack by the usual feed mechanism including a feed slide or carriage (not shown) which is mounted to reciprocate on table 1 by means of a crank arm 4, which actuates the reciprocating carriage through a link 5. When the feed slide is moved to the left (Fig. 1) it feeds and delivers the lowermost blank from the stack or blanks in magazine 2 to a pair of continuously driven measuring rolls 6, through which the evening mechanism and the marking mechanism are adjusted and set in accordance with the thickness of the thinnest part of the blank as determined by the measuring rolls 6.

Upon leaving the measuring rolls 6 the blank passes between a continuously driven conveyor chain 7 and a spring-pressed shoe or presser bar 8 and is conveyed by the conveyor chain 7 to a pair of feeding and skiving rolls 9 and 10, which feed the blank past the skiving knife 11. The upper roll 9 is continuously driven by the usual mechanism while the lower roll 10 runs idly. The shaft 12 of the upper roll 9 is journaled in bearing blocks 13 which slide in vertical ways on the frame of the machine. Above roll 9 is shown one end of the usual adjusting bar 14 which slides transversely of the machine in a crosshead of the frame and carries on its under side the usual wedge-shaped abutment blocks to cooperate with complementary abutment blocks on top of the bearing blocks 13. The slide bar 14 is automatically adjusted endwise and set in accordance with the thickness of the thinnest spot of the blank as determined by the measuring rolls 6, the position of the slide bar 14 and its wedge-shaped abutment blocks determining the extent of the upward displacement of roll 9 when the blank passes between rolls 9 and 10 and consequently determining the thickness of the skiving which will be removed from the under side of the blank by the skiving knife 11. The marking mechanism is indicated generally at 15 and is adjusted and set as usual from the adjustable slide bar 14, and is operated as usual to mark the blank on its way to the evening mechanism.

As more fully described in the Cogswell patent referred to, the crank arm 4 for feeding in the blanks from the magazine is fast upon the end of a normally stationary shaft 16, which is automatically controlled by the passing blanks so that each outgoing blank will cause the shaft to make one rotation and stop.

Thus the blanks are fed through the machine one by one, measured by the detecting rolls to determine the thickness of the thinnest spot of the blank or of a selected area of the blank, marked or stamped with a character, usually in terms of irons and half irons, in accordance with the detected measurement and skived or evened down to the thickness of the thinnest spot as determined by the detecting or measuring rolls.

The machine as thus far described may be substantially like the well known Nichols and Cogswell grading machines, an example of which is more fully described in said Cogswell Patent No. 1,726,610.

The sorting or distributing mechanism indicated generally at B in Fig. 1 is disposed at the rear or delivery end of the measuring, evening and/or grade-marking mechanism indicated generally at A. The sorting mechanism includes a traveling conveyor in the form of a turntable 17 comprising a circular rim 18 (Figs. 1 and 4) connected by spokes 19 with a hub 20 fast on a vertically disposed axle 21. The axle 21 is journaled in bearings provided upon a bracket 22 (Figs. 1 and 7) fastened at its lower end by screws or bolts 23 to the ends of a pair of arms 24 which are fixed to and form part of the frame of the machine.

At its lower end the axle 21 has fixed to it a ratchet wheel 25 engaged by a spring-pressed pawl 26 (Figs. 7 and 8) carried by a lever 27 which is fulcrumed loosely on axle 21. The outer end of lever 27 (Figs. 5 and 6) is pivotally connected at 28 to a block 29 carrying a stud 30 which occupies a slot 31 formed in a connecting rod 32 (Figs. 1, 5, 6, and 7). The opposite end of the connecting rod 32 is pivoted to a wrist pin 33 on crank arm 4, which is the same wrist pin to which the connecting rod 5 of the feeding mechanism is pivoted. A spring 34 connecting the lever 27 and the rod 32 normally holds the stud 30 against the inner end of slot 31.

Thus each time a single revolution is imparted to the shaft 16 and crank arm 4 for feeding a blank from the magazine 2 to the detecting or measuring rolls 6, the crank arm 4 also acts through the connecting rod 32 and spring 34 to vibrate the lever 27, thereby rotating the turntable 17 one step through the pawl and ratchet 26, 25, during the movement of the connecting rod 32 toward the right (Fig. 1). The ratchet wheel 25 has 12 teeth and each time the lever 27 is vibrated the ratchet wheel and consequently the turntable is rotated to the extent of one tooth or $\frac{1}{12}$ of a complete revolution.

The axle 21 also has fixed to it a notched wheel 35 which is normally engaged by a detent 36 to lock the turntable 17 against rotative displacement between the step movements thereof. This detent 36 is pivotally mounted at 37 (Fig. 7) in a vertical slot provided at the lower end of bracket 22. The upper end of the detent is made with a laterally extending arm 38 which is connected by a spring 40 with an upwardly extending arm 39 fixed to the top of lever 27. The spring 40 yieldingly holds the detent 36 in locking engagement with the notched wheel 35, but the upwardly extending end 41 of the arm 39 is so disposed that when the lever 27 is swung to the left (Fig. 6) and is nearing the limit of its movement in that direction the end 41 engages the extension 38 of the detent 36 and thereby disengages the detent 36 from the notched wheel 35. This movement holds the detent 36 out of engagement with the wheel 35 until after the lever 27 has started to swing toward the right so that when the detent 36 again engages the wheel 35 it will find its way into the next adjacent or succeeding notch to that from which it was just previously removed by the arm 39. In this way the turntable is maintained normally locked against angular displacement by the detent 36 which is operated momentarily to disengage the notched locking wheel 35 to permit each step movement of the turntable.

The above-described mechanism for actuating the turntable 17 is timed to complete each step movement of the turntable just as the trailing end of each blank is being discharged from between the feeding and skiving rolls 9 and 10.

There are twelve radial spokes 19 angularly spaced a uniform distance apart so that each step movement imparted to the turntable moves the turntable a distance which is equal to the distance between two adjacent spokes.

In the spaces between the spokes are a series of individual tilting shelves or carriers for receiving the blanks from the feed rolls 9 and 10 of mechanism A, conveying them to the selected delivery or unloading stations and there depositing them. Each shelf or carrier 44 is fastened to the top side of a pivot pintle 43 whose ends are journaled in bearing blocks 42 fixed to the radial spokes 19. The axes of the pivots 43 are arranged in a circle about the axis of the turntable and are disposed tangentially of said circle. The shelves 44 normally occupy an approximately horizontal position between two adjacent spokes. The inner end of each shelf 44 toward the center of the turntable is somewhat heavier than the part which lies outside of the pivot pintle 43 so that the shelves are normally held by gravity in horizontal position with their inner ends resting against stop pins 45 (Figs. 2 and 3) fixed to gravity latches 49.

To each spoke 19 is pivotally connected at 46 a latch carrier 47 in the form of a depending arm. To each latch carrier 47 is pivoted at 48 a gravity latch 49, provided with the stop pin 45 extending beneath the inner end of the adjacent shelf or carrier 44.

Each latch carrier 47 is yieldingly clamped against the side of its spoke 19 so as to have frictional engagement therewith sufficient to hold the latch carrier frictionally in different angular positions to which it may be adjusted on the axis of its bolt 46. To this end a split spring washer 50 (Fig. 3) on bolt 46 is clamped and compressed against the side of the adjacent spoke 19 by means of a pair of nuts 51 mounted on the threaded shank of the bolt 46.

The upper end of each latch 49 is made with a hook or detent 52 which engages an upstanding lip 53 provided on shelf 44. The lower and heavier arm of each latch 49 extends below its carrier 47 to cooperate with a spirally arranged series of stationary latch-tripping members 54 mounted on a circular bed plate 55 which surrounds the axle 21 and is fastened to the ends of the arms or frame 24. These latch-tripping members 54 consist of upstanding posts each provided at the top with a thin blade 56 for engagement with the latches 49 as will presently be described.

Each latch carrier 47 is angularly adjustable on its pivot 46 so that its latch 49 may be shifted to cooperate selectively with any one of the latch-tripping members 54 which, as already stated, are spirally positioned around the axis of the turntable and are consequently disposed at progressively varying or graduated distances from said axis.

Just outside of the path of the latch carriers 47 is an adjusting member 57 for the latch carriers in the form of an arm fixed to one end of a short horizontal shaft 58 journaled and movable endwise in a bracket 59 fastened to the top of the bed plate 55. At the end of the shaft 58 opposite the adjusting member 57 is fixed an arm 60 carrying a stud 61 which is engaged by a fork in the rear end of a lever 62 fulcrumed at 63 (Fig. 1) on the framework of the machine. The other arm of lever 62 is connected by a link 64 with the shaft 12 of the upper feeding and skiving roll 9. When the upper roll 9 is raised by a blank a greater or less distance according to the grade thickness of the blank, it acts through link 64, lever 62 and shaft 58 to adjust the latch shifting member 57 a corresponding extent.

During each period of rest of the turntable 17 a latch carrier 47 at the final unloading station of the series occupies a position directly in the path of the latch adjusting member 57, and when the latter is swung toward the axis of the turntable in response to the entrance of a blank between the rolls 9 and 10 and the lifting of roll 9, it operates to adjust said latch carrier radially of the turntable to an extent proportional to the upward displacement of the roll 9, which is limited, as usual, by the abutment blocks on slide bar 14 previously set in accordance with the detected grade measurement of the blank. That is to say, a blank having a thin area of given measurement will first operate through the measuring rolls 6 to adjust and set the slide bar 14 in accordance with the measurement of the thin spot of the blank and will thereafter act through feed roll 9 and the described connections, including the latch-adjusting member 57, to adjust the latch carrier 47 then in the path of the member 57 toward the axis of the turntable a corresponding distance, where it is frictionally held by the bolt 46 and friction washer 50, the extent of the adjustment of the latch carrier toward the axis of the turntable depending upon and being proportional to the thickness grade of the blank as determined by the measuring rolls. A blank of comparatively thick grade will position the latch carrier 47 so that its latch will cooperate with one of the latch-tripping posts or abutments 54 nearer to the axis of the turntable, while a blank of comparatively thin grade will position the latch carrier so that its latch will cooperate with one of the latch-tripping posts or abutments 54 more remote from the center of the turntable.

As the turntable 17 is rotated step by step during the operation of the machine, the carriers or shelves 44 are successively brought into position at a loading station indicated at X (Fig. 4) and while the turntable is at rest between its step movements and while each successive shelf occupies this position, the feeding and skiving rolls 9 and 10 deliver an evened sole or other blank upon it.

During the step by step rotation of the turntable each shelf is moved around so as to dwell at each of a series of eleven unloading stations $a$, $b$, $c$, $d$, $e$, $f$, $g$, $h$, $i$, $j$, and $k$. A latch-tripping post 54 is positioned at each unloading station, excepting the last station $k$, and as each shelf 44 comes into position at an unloading station which is provided with a latch-tripping post 54 its latch 49, if it has been set by the latch-adjusting member 57 in position to engage the tripping post 54 at that particular unloading station, will be tripped and swung by the post 54 so as to disengage the detent 52 from a lip 53 on the inner end of the shelf and thereby release the shelf to tilt and dump its blank at that station.

The blanks are deposited from the feed rolls 9 and 10 upon the outer ends of the carriers or shelves 44 and the combined weight of the outer end of each shelf and the blank resting thereon is greater than the weight of the shelf and load at the inner side of the pivot 43. Consequently, when a loaded shelf arrives at the selected unloading station and its latch 49 is unlatched by the abutment post 54 thereof, the outer end of the shelf will tilt downwardly by gravity, as indicated in dotted lines on Fig. 1, and discharge the blank at that station, the blank passing off the outer end of the shelf adjacent the periphery of the turntable. Each shelf 44 is provided at one side with an upwardly extending arm 65 which limits the tilting movement of the shelf by engagement with the adjacent spoke 19.

As soon as a blank has been discharged at the selected unloading station the heavier inner end of the shelf 44 restores the latter to its normal horizontal position where it rests upon the stop 45 (Fig. 3). The engagement of the inner end of the shelf with the stop 45 during the return movement of the shelf to its normal position assists in restoring the detent 52 of the latch 49 to a position above the lip 53. A projection 66 at the upper end of each latch 49 engages the side of the latch carrier 47 to limit the movement of the latch toward its operative position.

As each shelf 44 moves from station $j$ to the final unloading station $k$, a stationary cam 67, fixed on the frame of the machine, engages the latch carrier 47 and swings or adjusts the latch carrier and latch 49 outwardly away from the axis of the turntable into position where the hook or detent 52 of the latch registers with a passageway or notch 68 (Fig. 5) formed in one side of each shelf. Consequently all soles or blanks which have not been discharged at the previous stations will be discharged at station $k$ since the shelf is free to rock on its pivot while the hook 52 is in register with the notch 68.

The parts are so timed that each shelf 44 arrives at the unloading station $k$ before the blank, which is next to be delivered upon it, enters between the feed rolls 9 and 10. While the shelf occupies its position at station $k$ its latch carrier 47, which has been swung to its outermost position by cam 67, is in the path of the retracted latch-adjusting member 57 as shown by full lines in Fig. 2. The next blank then enters between the feed rolls 9 and 10 and causes the adjusting member 57 to swing inward toward the center of the turntable and to adjust latch carrier 47 and latch 49 of the shelf 44 while the shelf is at station $k$. (See dotted line position in Fig. 2.) Then just as the blank is about to be discharged from between the feed rolls 9 and 10 the turntable 17 is given a step movement to bring the shelf with its adjusted latch into position at the loading station X where it receives the blank from the feed rolls 9 and 10.

The evening and marking mechanism A is so timed that the shaft 16 is caused to make one revolution just before the rear or trailing end of the blank passes through the feed rolls 9 and 10; hence the turntable 17 makes its step movement before the roll 9 drops and retracts the latch-adjusting member 57. As a result of this the next latch carrier 47, arriving at unloading station $k$, will strike against the side of the latch-adjusting arm 57 and shift the same, together with its shaft 58, endwise of the shaft 58 against the pull of spring 70 (Figs. 5 and 6). Immediately thereafter the blank passes out from between the feed rolls 9 and 10 and falls by gravity on the shelf 44 which has just arrived at the loading position X. The instant a blank passes out from between feed rolls 9 and 10 roll 9 drops and thereby retracts the adjusting arm 57, which permits the spring 70 to shift shaft 58 endwise and restore the adjusting arm 57 to its normal position ready to adjust the latch carrier of the next succeeding shelf which has now arrived at station *k*. When the next succeeding blank enters between rolls 9 and 10 and raises roll 9 the adjusting arm 57 will adjust the latch carrier of the shelf at station *k* in accordance with the thickness grade of said next succeeding blank as determined by the measuring roll 6 in the manner already described.

The feeding action of the connecting rod 32 (Fig. 6) is transmitted to the lever 27 and the turntable through the spring 34 so that when the turntable makes each step movement it is yieldingly actuated by the spring. The purpose of this is to avoid sudden jerks and shocks such as would occur if the lever were positively actuated especially when the turntable is heavily loaded.

An advantage of a distributing turntable which rotates step by step always in the same direction is that there is no lost time and no lost motion as is the case with a vibrating distributor which swings back and forth in either direction, such as has heretofore been used.

In the particular embodiment of the invention herein shown the machine is designed to sort and distribute blanks ranging in thickness from twelve irons to seven irons inclusive, the blanks differing in grade by one-half an iron. This requires eleven unloading stations. It will be understood, however, that the number of unloading stations may be varied and that the machine may be adapted to any other desired range of measurements or unit of measurements.

When the machine is designed as herein illustrated to sort eleven grades of soles or blanks ranging in thickness from twelve irons to seven irons and differing from one another by one-half an iron, the first latch-tripping abutment 54 nearest the loading station X is positioned nearest to the axis of the turntable and operates to discharge the twelve iron blanks at unloading station *a*. The other latch-tripping abutments 54 are spaced outwardly away from the axis of the turntable at progressively increasing distances of three and one-half irons each. The latch-adjusting arm 57, which shifts the latch carriers inwardly, swings the lower end of each latch 49 a distance seven times the distance of the upward displacement of the feed roll 9 caused by the blanks. The latch-tripping abutments should therefore be positioned proportionately. For example, when the feed roll 9 is raised one-half an iron the latch which is at that time in position to be adjusted will have its lower free end moved toward the axis of the turntable a distance equal to seven times one-half an iron, or three and one-half irons. The distances of the latch-tripping abutments from the axis of the turntable should therefore vary progressively by three and one-half irons. A twelve iron blank will then be unloaded at station *a*; an eleven and one-half iron blank at station *b*; an eleven iron blank at station *c*; and so on around to station *k* where all soles measuring seven irons or less will be unloaded.

It will be understood that suitable bins or containers may be positioned under the turntable at the several unloading stations to receive the blanks discharged from the shelves, sorted and segregated according to their grade measurements.

The fixed cam 67, in addition to performing an unlatching and dumping function similar to that performed by the unlatching members 54, serves also as a resetting cam to restore each latch carrier 47 to its outermost position as shown by full lines in Fig. 2 as it arrives at the last unloading station *k*, so that each latch carrier is in position to be adjusted inwardly by the adjusting member 54 while at the last unloading station *k* preparatory to receiving the next blank at loading station X.

The measuring, evening and marking mechanism A serves as means for automatically delivering the soles or blanks to the turntable 17 one by one in timed relation to the step movements of the turntable, so that during the operation of the machine the evened and marked blanks are automatically sorted and distributed according to their grade measurements. It will be understood, however, that either the skiving knife for evening the blanks or the marking device or both might be omitted, in which case the machine would measure and sort the blanks in the same manner as already described without evening them or marking them if the operator should desire to omit one or both of those operations.

I claim:

1. A blank sorting machine comprising means for measuring successive blanks according to thickness, distributing mechanism including an intermittently traveling conveyor and individual carriers moving with the conveyor, by which the blanks are successively received and carried after being measured, means to move the conveyor step by step to bring the carriers successively into position to receive the blanks while the conveyor is at rest between its step movements, means positively to lock the conveyor against displacement during its periods of rest and to unlock it to permit its step by step movements, and mechanism responsive to the measuring means for causing the blanks to be discharged from the carriers at different stations according to their measurements, said mechanism comprising a latch associated with each carrier and an adjustable member associated with each latch, setting means responsive to the operation of said measuring means for positioning the adjustable members in a position corresponding to the measured thickness of the blanks, and graduated trip members arranged to engage the adjustable members during movement of the conveyor and effect the release of the latches.

2. A blank sorting machine comprising means for measuring successive blanks according to thickness, reciprocating feed mechanism for feeding the blanks one by one to the measuring means, distributing mechanism including an intermittently traveling conveyor and individual carriers moving with the conveyor, by which the blanks are successively received and carried after being measured, connecting means actuated by the feed mechanism upon each reciprocation thereof to move the conveyor step by step to bring the carriers successively into position to receive the blanks while the conveyor is at rest between its step movements, and mechanism responsive to the measuring means for causing the blanks to be discharged from the carriers at different stations according to their measurements, said mechanism comprising a latch associated with each carrier and an adjustable member associated with each latch, setting means responsive to the operation of said measuring means for positioning the adjustable members in a position corresponding to the measured thickness of the blanks, and graduated trip members arranged to engage the adjustable members during movement of the conveyor and effect the release of the latches.

3. A blank sorting machine comprising means for measuring successive blanks according to thickness, reciprocating feed mechanism for feeding the blanks one by one to the measuring means, distributing mechanism including an intermittently traveling conveyor and individual carriers moving with the conveyor, by which the blanks are successively received and carried after being measured, connecting means actuated by the feed mechanism upon each reciprocation thereof to move the conveyor step by step to bring the carriers successively into position to receive the blanks while the conveyor is at rest between its step movements, said connecting means including a spring through which the conveyor is yieldingly actuated, and mechanism responsive to the measuring means for causing the blanks to be discharged from the carriers at different stations according to their measurements, said mechanism comprising a latch associated with each carrier and an adjustable member associated with each latch, setting means responsive to the operation of said measuring means for positioning the adjustable members in a position corresponding to the measured thickness of the blanks, and graduated trip members arranged to engage the adjustable members during movement of the conveyor and effect the release of the latches.

4. A blank sorting machine comprising means for measuring successive blanks according to thickness, reciprocating feed mechanism for feeding blanks one by one to the measuring means, distributing mechanism including an intermittently rotatable turntable having individual carriers mounted thereon, by which the blanks are successively received and carried after being measured, means actuated by the feed mechanism upon each reciprocation thereof to rotate the turntable step by step to bring the carriers successively into position to receive the blanks while the turntable is at rest between its step movements, and mechanism responsive to the measuring means for causing the blanks to be discharged from the carriers at different stations according to their measurements, said mechanism comprising a latch associated with each carrier and an adjustable member associated with each latch, setting means responsive to the operation of said measuring means for positioning the adjustable members in a position corresponding to the measured thickness of the blanks, and graduated trip members arranged to engage the adjustable members during movement of the conveyor and effect the release of the latches.

5. A blank sorting machine comprising means for measuring successive blanks according to thickness, reciprocating feed mechanism for feeding blanks one by one to the measuring means, distributing mechanism including an intermittently rotatable turntable having individual carriers mounted thereon, by which the blanks are successively received and carried after being measured, means actuated by the feed mechanism upon each reciprocation thereof to rotate the turntable step by step to bring the carriers successively into position to receive the blanks while the turntable is at rest between its step movements, means to lock the turntable against rotation during its periods of rest and to unlock it to permit its step by step movements, and mechanism responsive to the measuring means for causing the blanks to be discharged from the carriers at different stations according to their measurements, said mechanism comprising a latch associated with each carrier and an adjustable member associated with each latch, setting means responsive to the operation of said measuring means for positioning the adjustable members in a position corresponding to the measured thickness of the blanks, and graduated trip members arranged to engage the adjustable members during movement of the conveyor and effect the release of the latches.

6. A blank sorting machine comprising means for measuring successive blanks according to thickness, distributing mechanism including a rotatable turntable having individual tilting shelves pivotally mounted thereon adapted to receive and carry the blanks after they have been measured, the axes of the pivots of said shelves being arranged in a circle about the axis of the turntable and disposed tangentially of said circle whereby the blanks will be discharged off the outer ends of the shelves adjacent the periphery of the turntable when the outer ends of the shelves tilt downwardly, each shelf when not loaded having a normal tendency toward blank-supporting position under the influence of gravity and when loaded having a tendency toward dumping position, an adjustable member associated with each tilting shelf for holding the shelf in blank-supporting position, mechanism responsive to the measuring means for positioning the adjustable shelf-holding members in a position corresponding to the measured thickness of the blanks, and means selectively cooperating with the adjustable shelf-holding members to release the same and permit the loaded shelves to tilt by gravity and discharge the blanks at different stations according to their measurements.

7. A blank sorting machine comprising means for measuring successive blanks according to thickness, a feed roll to which each blank passes after leaving the measuring means, said feed roll being adapted to be displaced by each blank to an extent governed by the measurement of each blank as determined by the measuring means, distributing mechanism including an intermittently traveling conveyor and individual carriers moving with the conveyor, by which the blanks are successively received from said feed roll and carried to their several unloading stations, and mechanism controlled by the displacement of said feed roll for causing the blanks to be discharged from the carriers at different stations according to their measurements, said mechanism comprising a latch associated with each carrier and an adjustable member associated with each latch, setting means responsive to the operation of said measuring means for positioning the adjustable members in a position corresponding to the measured thickness of the blanks, and graduated trip members arranged to engage the adjustable members during movement of the conveyor and effect the release of the latches.

8. A blank sorting machine comprising means for measuring successive blanks according to thickness, a feed roll to which each blank passes after leaving the measuring means, said feed roll being adapted to be displaced by each blank to an extent governed by the measurement of each blank as determined by the measuring means, distributing mechanism including an intermittently rotatable turntable having individual carriers mounted thereon by which the blanks are successively received from said feed roll and carried to their several unloading stations, means to rotate the turntable step by step to bring the carriers successively into position to receive the blanks from the feed roll while the turntable is at rest between its step movements, and mechanism controlled by the displacement of said feed roll for causing the blanks to be discharged from the carriers at different stations according to their measurements, said mechanism comprising a latch associated with each carrier and an adjustable member associated with each latch, setting means responsive to the operation of said measuring means for positioning the adjustable members in a position corresponding to the measured thickness of the blanks, and graduated trip members arranged to engage the adjustable members during movement of the conveyor and effect the release of the latches.

9. A blank sorting machine comprising means for measuring blanks according to thickness, distributing mechanism including an intermittently traveling conveyor and individual carriers moving with the conveyor, by which the blanks are successively received and carried after being measured, mechanism responsive to the measuring means for causing blanks within a predetermined range of measurements to be discharged from the carriers at different unloading stations according to their measurements, said mechanism comprising a latch associated with each carrier and an adjustable member associated with each latch, setting means responsive to the operation of said measuring means for positioning the adjustable members in a position corresponding to the measured thickness of the blanks, and graduated trip members arranged to engage the adjustable members during movement of the conveyor and effect the release of the latches, and means at the final unloading station to cause all blanks which have not been discharged from the carriers at a preceding station to be discharged at the final station, said means comprising a trip engageable with each adjustable member and operative to position it in a position to be reset by the setting means.

10. A blank sorting machine comprising means for measuring successive blanks according to thickness, distributing mechanism including an intermittently traveling conveyor and individual tilting shelves moving with the conveyor and adapted to receive the blanks after they have been measured and to carry them to a series of unloading stations, an adjustable latch for holding each shelf in blank-supporting position, mechanism responsive to the measuring means to control the adjustment of the latches in accordance with the measurements of the blanks, and a series of stationary, graduated, unlatching members, one for each unloading station, adapted selectively to disengage the latches from the shelves according to their several positions of adjustment thereby to cause the shelves to tilt and discharge the blanks at the several selected unloading stations, the unlatching member at the final unloading station being adapted to disengage all latches which have not been disengaged at a preceding station thereby to cause all shelves still remaining loaded to tilt and discharge their blanks at said final station, said mechanism responsive to the measuring means being effective to operate the successive latches while they are respectively at said final unloading station.

JAMES W. JOHNSTON.